(12) United States Patent
Procida

(10) Patent No.: US 9,040,136 B2
(45) Date of Patent: May 26, 2015

(54) FLEXIBLE PIPE

(75) Inventor: Inger-Margrete Procida, Hellerup (DK)

(73) Assignee: NATIONAL OILWELL VARCO DENMARK I/S, Brondby (DK)

( * ) Notice: Subject to any disclaimer, the term of this patent is extended or adjusted under 35 U.S.C. 154(b) by 1150 days.

(21) Appl. No.: 12/531,135

(22) PCT Filed: Mar. 17, 2008

(86) PCT No.: PCT/DK2008/050068
§ 371 (c)(1),
(2), (4) Date: Oct. 28, 2009

(87) PCT Pub. No.: WO2008/113362
PCT Pub. Date: Sep. 25, 2008

(65) Prior Publication Data
US 2010/0062202 A1 Mar. 11, 2010

(30) Foreign Application Priority Data
Mar. 16, 2007 (DK) .................. 2007 00404

(51) Int. Cl.
| | |
|---|---|
| *B32B 1/02* | (2006.01) |
| *B32B 27/12* | (2006.01) |
| *F16L 11/08* | (2006.01) |
| *F16L 11/12* | (2006.01) |
| *B32B 1/08* | (2006.01) |

(52) U.S. Cl.
CPC . *B32B 1/08* (2013.01); *B32B 27/12* (2013.01); *F16L 11/081* (2013.01); *F16L 11/125* (2013.01)

(58) Field of Classification Search
USPC .............. 428/34.1, 34.2, 35.7, 35.9, 36.9
See application file for complete search history.

(56) References Cited

U.S. PATENT DOCUMENTS

| | | |
|---|---|---|
| 4,549,581 A | 10/1985 | Unno et al. |
| 4,861,584 A | 8/1989 | Powell, Jr. et al. |
| 4,988,548 A | 1/1991 | Takemura et al. |
| 5,730,188 A | 3/1998 | Kalman et al. |

(Continued)

FOREIGN PATENT DOCUMENTS

| | | |
|---|---|---|
| EP | 1119684 B1 | 8/2001 |
| EP | 1255944 B1 | 11/2002 |

(Continued)

OTHER PUBLICATIONS

Denmark Search Report for PA 2007 00404 dated Oct. 25, 2007.

(Continued)

*Primary Examiner* — Marc Patterson
(74) *Attorney, Agent, or Firm* — Pearne & Gordon LLP

(57) ABSTRACT

The invention relates to a flexible pipe comprising at least one polymer layer, and at least one armoring layer unbounded to said polymer layer, wherein at least one polymer layer is a cationic clay containing polymer layer of a polymer material comprising a polymer matrix and from about 0.1 to about 5% by weight of at least one cationic clay silicate.

Preferred cationic clay silicates comprise kaolinite; smectite; Illite; chlorite; and synthetic cationic clays. The cationic clay silicate may e.g. be an organo-cationic clay.

The cationic clay silicate may preferably be exfoliated and/or intercalated in the polymer matrix.

The polymer layer may preferably comprise an inner liner, a thermally insulating layer, an anti-wear layer and/or an outer sheath or a sub-layer thereof.

30 Claims, 2 Drawing Sheets

(56) References Cited

U.S. PATENT DOCUMENTS

| | | | |
|---|---|---|---|
| 5,744,206 A | 4/1998 | Russek et al. | |
| 5,813,439 A | 9/1998 | Herrero et al. | |
| 6,037,025 A | 3/2000 | Matsunaga et al. | |
| 6,110,550 A | 8/2000 | Jarrin et al. | |
| 6,123,114 A | 9/2000 | Sequin et al. | |
| 6,192,941 B1 | 2/2001 | Mallen-Herrero et al. | |
| 6,283,161 B1 | 9/2001 | Feret et al. | |
| 6,354,333 B1 | 3/2002 | Dupoiron et al. | |
| 6,408,891 B1 | 6/2002 | Jung et al. | |
| 6,417,262 B1 * | 7/2002 | Turner et al. | 524/445 |
| 6,454,897 B1 | 9/2002 | Morand | |
| 6,668,867 B2 | 12/2003 | Espinasse et al. | |
| 6,691,743 B2 | 2/2004 | Espinasse | |
| 6,855,426 B2 * | 2/2005 | Yadav | 428/403 |
| 7,157,516 B2 | 1/2007 | Chaiko | |
| 2001/0045237 A1 | 11/2001 | Monobe et al. | |
| 2002/0165305 A1 * | 11/2002 | Knudson et al. | 524/445 |
| 2002/0185188 A1 * | 12/2002 | Quigley et al. | 138/137 |
| 2003/0190444 A1 | 10/2003 | Stoppelmann et al. | |
| 2003/0194522 A1 | 10/2003 | Kurimoto et al. | |
| 2004/0127627 A1 * | 7/2004 | Gilmer et al. | 524/445 |
| 2004/0142135 A1 | 7/2004 | Verschuere et al. | |
| 2005/0058795 A1 | 3/2005 | Beck et al. | |
| 2005/0221033 A1 * | 10/2005 | Procida | 428/35.7 |
| 2006/0011250 A1 | 1/2006 | Ikemoto et al. | |

FOREIGN PATENT DOCUMENTS

| | | |
|---|---|---|
| EP | 1269057 B1 | 1/2003 |
| EP | 1269058 B1 | 1/2003 |
| EP | 1277007 B1 | 1/2003 |
| EP | 1351001 A1 | 10/2003 |
| EP | 1384026 B1 | 1/2004 |
| EP | 1475650 A1 | 11/2004 |
| EP | 1494845 B1 | 1/2005 |
| EP | 1507110 A1 | 2/2005 |
| EP | 1574330 A1 | 9/2005 |
| WO | 0034372 A1 | 6/2000 |
| WO | 0036324 A1 | 6/2000 |
| WO | 0181809 A1 | 11/2001 |
| WO | 0242674 A1 | 5/2002 |
| WO | 2005028198 A1 | 3/2005 |
| WO | 2005090475 A1 | 9/2005 |
| WO | 2006047691 A2 | 5/2006 |

OTHER PUBLICATIONS

J.N. Hay et al, "Clay-Based Nanocomposites", A Review of Nanocomposites 2000.

* cited by examiner

FLEXIBLE PIPE

TECHNICAL FIELD

The invention relates to a flexible pipe and in particular a flexible pipe for use in off shore applications e.g. for the transportation of oil products and gas products e.g. from a drilling site to a host oil platform and for use in water transport over long distances and often under high pressures.

BACKGROUND ART

Flexible offshore pipes of the type in question normally comprise a tube-formed inner liner and at least one reinforcement layer. Often such pipes are used for the transportation of oil and gas products over long distances and often at elevated temperatures, such as above 60° C. or more.

Flexible offshore pipes are also used for injection of chemicals into a sub-sea drilled well e.g. connected between a host oil platform and a sub-sea satellite installation.

Flexible pipes may also be used for transportation of other liquids such as water preferably over long distances both onshore and offshore—e.g. for delivering water to dry areas.

A general requirement to such flexible offshore pipes is that they should be capable of operating at relatively high pressures, and the pipes should be sufficiently resistant to the fluids they are transferring and the environment they are operating in. It is thus highly desirable that the flexible pipes are resistant to e.g. chemicals, crude oils, aggressive gasses and/or water, including seawater. Furthermore such flexible pipes should be flexible so that they can be spooled onto a drum or reel. In practice this is the whole point in using flexible pipes.

Flexible pipes e.g. for offshore use are normally very long. Risers, which are pipes extending at least to a certain degree vertically from seabed towards sea surface, are often several hundred meters long and flow-lines, which are pipes extending essentially along the seabed, are often several kilometers long. The flexible pipes are typically subjected to high pressures and pressure differences along the pipeline. When the pipe is transporting oil or gas, the pipes may be exposed to temperatures substantially above 60° C. The flexible pipes should therefore preferably be capable of operating at high temperatures and high pressures.

Offshore pipes generally comprise one or more tube-formed layers including an inner liner, and at least one reinforcing layer. The inner liner is the innermost polymer layer, which in known flexible pipes also constitutes a barrier the fluid to be transported, e.g. crude oil.

In most situations, the pipeline also comprises an outer polymeric sheath providing a barrier to the outer environment such as seawater. The pipe normally comprises one or more reinforcing layers between the inner liner and the outer sheath, and some pipes also comprise a reinforcing layer inside the inner liner, called a carcass. The carcass prevents collapse of the inner liner and provides mechanical protection to the inner liner. Some pipes also comprise one or more intermediate polymer layers.

All of these layers affect the property of the flexible pipe, including the strength, the barrier effects, the flexibility and the durability.

Continuous efforts are applied in order to improve properties of polymer layers of flexible pipes such as for example polymers for the inner liner.

In general it is desired that the inner liner should be chemically stable and mechanically strong even when subjected to high temperatures. A number of polymers are presently used for the production of inner liners as well as other polymer layers of the flexible pipe, such as Polyamide-11 (PA-11), polyethylene (PE) and Polyvinylidene diflouride (PVDF).

These materials are chosen to fulfil the combined requirements in a specific application e.g. heat stability, resistance to crude oil, resistance to seawater, resistance to gases, resistance to acidic components, mechanical fatigue, ductility, strength, durability and processability.

DISCLOSURE OF INVENTION

An object of the invention is to provide a flexible pipe with a polymer layer with an optimized combination of properties, in particular an optimized combination of barrier properties, flexibility properties and strength properties.

This object of the invention is achieved by the invention as defined in the claims and described in the accompanying description. As it will be clear from the description various embodiments of the invention individual of each other and/or in combination provide additional beneficial improvements.

The flexible pipe of the invention comprises at least one polymer layer, and at least one armouring layer unbounded to said polymer layer, wherein at least one polymer layer is a cationic clay silicate containing polymer layer of a polymer material comprising a polymer matrix and from about 0.1 to about 5% by weight of at least one cationic clay silicate, preferably said at least one cationic clay silicate containing polymer layer comprises up to about 4% by weight of cationic clay silicate(s), such as from about 0.1 to about 5% by weight of cationic clay silicate(s).

It has thus been found that the cationic clay silicate containing polymer layer provides surprising improvements to the flexible pipe such as it will be described in the following. The cationic clay silicate may in principle be present in any one of the polymer layers Flexible pipes of for use in off shore transportation e.g. of crude oil and gasses are subjected to very acidic and aggressive environments, which puts high demands on the materials of which they are is made. When transporting aggressive and corrosive fluids such as crude oil, $H_2S$ and similar, the material of the polymer layers needs to be highly resistive to corrosion. Simultaneously the polymer layers should have high strength and desired barrier properties. According to the invention it has been found to be very beneficial to incorporate cationic clay silicate into one or more of the polymer layers to achieve these desired properties.

The cationic clay silicate may be any type of cationic clay silicate or mixtures thereof, such as one or more of the cationic clay silicates selected from the group consisting of kaolinite, such as dickite, halloysite, nacrite and serpentine; smectite, such as pyrophyllite, talc, vermiculite, sauconite, saponite, nontronite, hectorites (magnesiosilicates) and montmorillonite (bentonite); Illite; and chlorite.

It has been found that it is particularly beneficial to use cationic clay silicate selected from the smectite group, preferably selected from alumino-silicate(s) and magnesium-silicate(s), and flexible pipes with highly stable polymer layer(s) even when subjected to large temperature changes can thus be obtained using such cationic clay silicate in the polymer layer(s).

It is believed that the highly beneficial effect obtained by having the cationic clay silicate in the polymer layer is due to its layered structure. In this connection it has been found very surprising that the cationic clay silicate does not result in any significant reduction of flexibility, which in theory would be expected due to its structure.

The cationic clay silicate may preferably have an octahedral metal element crystal lattice structure, such as trioctahedral smectite and dioctahedral smectite.

When intermixing (compounding) the cationic silicate into the polymer ordinary compounding methods may be used. However care should be taken to apply sufficient shear forces to the composition to provide the desired homogeneity. The cationic clay silicate often tends to adhere to each other in agglomerate-like units: By applying sufficient shear forces the cationic clay silicate elements will be separated and intermixed. Often it is desired to provide the compounding at slightly lower temperature than normally for the respective polymer and instead prolong the compounding time for adding optimal shear forced. The compounding may for example be provided at a temperature of about the melting point to +20° C. for the polymer in question, such as at a temperature of about the melting point to +10° C. for the polymer in question. The compounding time may thus be relatively long without risk of undesired degradation of the polymer.

It has also been found that the cationic clay silicate is easier to intermix in the polymer composition if it is in the form of an organo-cationic clay. Preferred organo-cationic clays comprise surface modified cationic clay silicate, said organo-cationic clay preferably comprises an adsorbed monolayer of a quaternary amine.

Methods of producing such organo-clays are e.g. described in U.S. Pat. No. 4,861,584 and U.S. Pat. No. 7,157,516. These publications also describe how to produce syntactical clay silicate.

In one embodiment the organo-cationic clay is surface modified cationic clay silicate according to the following formula quaternary amine+−CLAY, wherein the quaternary amine preferably is selected from the group consisting of ditallow dimethyl ammonium chloride, hexadecyl ammonium chloride, octadecyl ammonium chloride, di-methyl di-hydrogenated tallow ammonium chloride, dicocodimethyl ammonium chloride, acids thereof, such as 12-aminododecanoic acid (ADA), and mixtures thereof.

The cationic clay silicate(s) may preferably be in the form of platelets having an aspect ratio of at least about 50, such as at least about 100, such as about 200 to about 2000, such as about 250 to about 2500. It has been found that an optimal strength/flexibility point may be obtained when at least about 75% by weight of the cationic clay silicate(s) have aspect ratio in the interval from about 500 to about 1000.

The cationic clay silicate(s) may preferably be in the form of platelets having a thickness of about 10 nm or less, such as of about 5 nm or less, such as of about 2 nm or less.

The cationic clay silicate may be fully exfoliated, partially exfoliated, intercalated, or partially intercalated.

In one embodiment the cationic clay silicate(s) are exfoliated in the polymer matrix. In the case where the cationic clay silicate(s) are exfoliated in the polymer matrix, the layers of the cationic clay silicate have been completely separated and the individual layers are distributed throughout the polymer matrix.

In one preferred embodiment the cationic clay silicate(s) are intercalated in the polymer matrix. Further information about intercalation can e.g. be found in "Clay Based Nanocomposites", Professor J. N. Hay and S. J. Shaw "A Review of Nanocomposites 2000"

In the case where the cationic clay silicate(s) are intercalated in the polymer matrix, an organic component, such as a polymeric component or a quaternary amine is preferably inserted between layers of the cationic clay silicates such that the inter-layer spacing is expanded, but the layers still bear a well-defined spatial relationship to each other.

The polymer of the polymer layer(s) may be any kind of polymer(s) such as the polymer used in the various layers today. In one embodiment the cationic clay silicate containing polymer layer(s) comprises at least about 50% by weight, such as at least about 70% by weight, such as at least about 85% by weight of one or more of the polymers selected from the group consisting of polyolefins, such as polyethylene and polypropylene; polyamide, such as poly amide-imide, polyamide-11 (PA-11) and polyamide-12 (PA-12); polyimide (PI); polyurethanes; polyureas; polyesters; polyacetals; polyethers, such as polyether sulphone (PES); polyoxides; polysulfides, such as polyphenylene sulphide (PPS); polysulphones, such as polyarylsulphone (PAS); polyacrylates; polyethylene terephthalate (PET); polyether-ether-ketones (PEEK); polyvinyls; polyacrylonitrils; polyetherketoneketone (PEKK); copolymers of the preceding; fluorous polymers such as polyvinylidene diflouride (PVDF), homopolymers and copolymers of vinylidene fluoride ("VF2"), homopolymers and copolymers of trifluoroethylene ("VF3"), copolymers and terpolymers comprising two or more different members selected from the group consisting of VF2, VF3, chlorotrifluoroethylene, tetrafluoroethylene, hexafluoropropene, and hexafluoroethylene.

The flexible pipe may preferably be unbonded. The term "unbonded" means in this text that at least two of the layers including the armouring layers and polymer layers are not bonded to each other. In practice the pipe will comprise at least two armouring layers, which are not bonded to each other directly or indirectly via other layers along the pipe. Thereby the pipe may become bendable and sufficiently flexible to roll up for transportation.

In one preferred embodiment the cationic clay silicate containing polymer matrix is cross-linked polyethylene (XLPE), e.g. XLPE being cross-linked by electromagnetic wave activation of a radical generator such as a peroxide. Such polymer layers without the cationic clay silicate are described in EP 1494845.

The flexible pipe preferably comprises an inner liner providing the innermost barrier to a fluid to be transported in the pipe. In one embodiment this inner liner is n cationic clay silicate containing polymer layer. The inner liner may e.g. be of XLPE and comprising cationic clay silicate. The amount of cationic clay silicate in such inner liner should preferably not exceed about 4% by weight, more preferably it should be from about 0.5 to about 3% by weight of the total layer.

The inner usually has a thickness of at least about 4 mm, such as at least about 6 mm, such as at least about 8 mm, such as at least about 10 mm, such as at least about 12 mm, preferably the polymer layer has a thickness between about 4 and about 20 mm, such as between about 8 and about 15 mm. The inner liner may in one embodiment be provided as a layered material comprising 2 or more sub-layers bounded to each other. In one embodiment at least one but not all of such sub-layers of an inner liner comprises cationic clay silicate. In such case the percentage of silicate is calculated only on basis of the sub-layer into which it is incorporated.

In one embodiment the flexible pipe comprises an outer sheath preferably providing the outermost barrier to water when the pipe in applied in water. This outer sheath may e.g. be a cationic clay silicate containing polymer layer. Also this outer sheath may be provided with sub layers as described for the inner liner.

In one embodiment the flexible pipe comprises an intermediate layer, such as a thermally insulating layer. Such intermediate layer or layers may e.g. be cationic clay silicate containing polymer layer(s). It has surprisingly been found that the cationic clay silicate may add to the insulating effect of an insulating layer in particular if the cationic clay silicate is intercalated in the material.

In one embodiment the flexible pipe comprises an intermediate layer in the form of an anti-wear layer. Such anti-wear layers are usually applied between armouring layers for preventing the armouring layer to slide against each other. The anti-wear layer(s) may e.g. be cationic clay silicate containing polymer layer(s). It has surprisingly been found that the cationic clay silicate has a friction lowering effect. This may partly be ascribed to the effect of raising the hardness of the material. The anti-wear layer may in one embodiment comprise from about 2 to about 5% by weight of cationic clay silicate. In one embodiment at least one sub layer of an anti-wear layer comprises at least from about 2 to about 5% by weight of cationic clay silicate. The cationic clay silicate may preferably be intercalated in the material.

The anti-wear layer may e.g. comprise about 50% by weight or more, such as about 70% by weight or more, such as about 80% by weight or more of a polyamide, such as Polyamide 11 (Rilsan®). It is in one embodiment desired that the anti-wear layer does not provide any significant barrier for fluid such that fluids from the annulus may flow through the layer, e.g. through holes provided in the layer or through gaps provided e.g. by applying the anti-wear layer in the form of wound tapes The cationic clay silicate containing polymer layer(s) has a thickness of at least about 0.5 mm, such as at least about 1 mm, such as at least about 2 mm, such as at least about 5 mm, such as up to about 20 mm.

The thicker the layer is the less percentage of the cationic clay silicate should preferably be applied.

For layers above about 2 mm it is generally preferred that the cationic clay silicate containing polymer layer(s) is an extruded layer. However the flexible pipe may comprise extruded layer(s) with a thickness as low as about 0.5 mm or even less.

In one embodiment the cationic clay silicate containing polymer layer(s) is a wound layer.

In one embodiment the cationic clay silicate containing polymer layer(s) is a folded layer.

In one embodiment the cationic clay silicate containing polymer layer(s) comprises a film layer having a thickness of up to about 0.5 mm. Such relatively thin film layer(s) may preferably be folded or wound.

In one embodiment such film layer is a layered material comprising at least one polymer sub-layer, such as two, such as three polymer sub-layer, the film layer optionally comprising one or more metal layers, at least one of the polymer sub-layers comprises cationic clay-silicates.

In one embodiment the film layer has a thickness of about 25 µm or more, such as about 100 µm or more, such as up to about 500 µm.

The film layer may e.g. be applied in direct contact to, and preferably innermost to another polymer layer e.g. as described in WO05028198 but with at least one cationic clay silicate containing layer.

The cationic clay silicate containing polymer layer may additionally comprise filler material (s), preferably selected from the group consisting of pigments, heat stabilisers, process stabilisers, metal deactivators, flame-retardants and/or reinforcement fillers. It is generally preferred to keep the amount of such additives low to reduce the risk of blistering and stress induced cracking. The reinforcement fillers may e.g. include glass particles, glass fibres, mineral fibres, talcum, carbon, carbonates, silicates, and metal particles.

In one embodiment the flexible pipe comprises one or more innermost unbounded armouring layers (carcass).

In one embodiment the flexible pipe comprises one or more unbounded armouring layers (outer armouring layers) on the outer side of an inner liner.

The flexible pipe of the invention may have a structure as described in any one of the prior art documents EP 1255944, EP 1269057, EP 1384026, EP 1475650, EP 1277007, 1269058, EP 1119684, U.S. Pat. No. 6,123,114, U.S. Pat. No. 6,691,743, U.S. Pat. No. 6,668,867, U.S. Pat. No. 5,813,439, WO 0242674, U.S. Pat. No. 5,730,188, U.S. Pat. No. 6,354,333, U.S. Pat. No. 4,549,581, U.S. Pat. No. 6,192,941, U.S. Pat. No. 6,283,161, WO 0181809, WO 0036324, U.S. Pat. No. 6,454,897, U.S. Pat. No. 6,408,891 and U.S. Pat. No. 6,110,550, with the difference that at least one polymer layer comprises cationic clay silicate.

BRIEF DESCRIPTION OF DRAWINGS

The invention will be explained more fully below in connection with a preferred embodiment and with reference to the drawings in which.

The figures are schematic and simplified for clarity, and they merely show details which are essential to the understanding of the invention, while other details are left out. Throughout, the same reference numerals are used for identical or corresponding parts.

Figure 1:
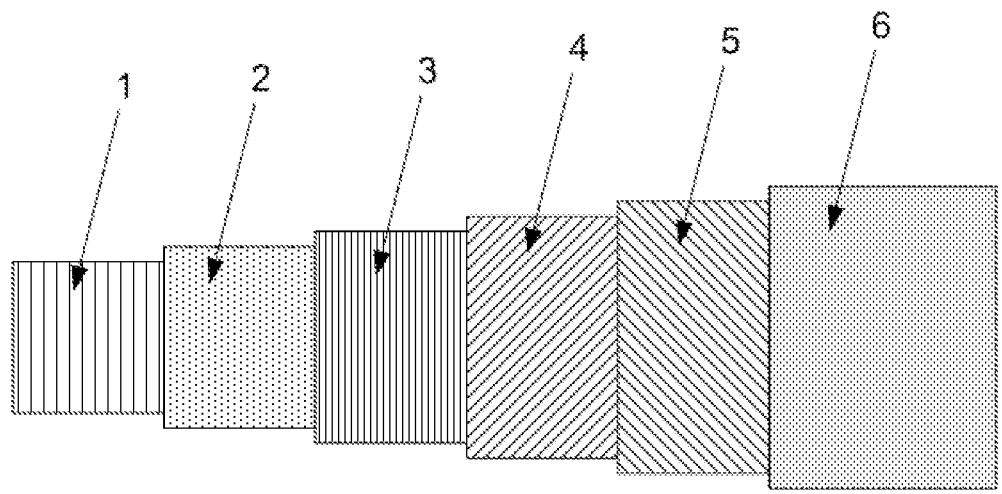
FIG. 1 shows a flexible pipe with a carcass.

The flexible unbonded pipe shown in FIG. 1 comprises an internal sealing layer 2 also called an inner liner, e.g. comprising cross linked PE. Inside the inner liner 2 the pipe comprises an inner armouring layer 1, called a carcass. On the outer side of the inner liner 2, the flexible unbonded pipe comprises three outer armouring layers 3, 4, 5. The outer armouring layer 3 closest to the inner liner 2, is a pressure armouring layer 3, made from wires wound at a steep angle to the centre axis of the pipe, e.g. close to 90 degrees. Around the pressure armouring layer 3, the pipe comprises a pair of cross wound tensile armouring layers 4, 5, made from wound wires. The tensile armouring layers 4, 5 are normally cross wound with equal or different angles of 70 degrees or less, typically 60 degrees or less, such as 55 degrees or less, such as between 20 and 55 degrees. In one embodiment one of the tensile armouring layers 4 has an angle above 55 degree, typically between 60 and 75 degrees, and the other one of the tensile armouring layers 5 has an angle below 55 degree, typically between 30 and 45 degrees.

The flexible pipe further comprises an outer sheath 6. The flexible pipe preferably also comprises not shown anti-wear layers between the armouring layers 3, 4, 5.

At least one of the polymer layers, the inner liner 2, the anti-wear layers or the outer sheath 6 is a cationic clay silicate containing polymer layer.

Figure 2:
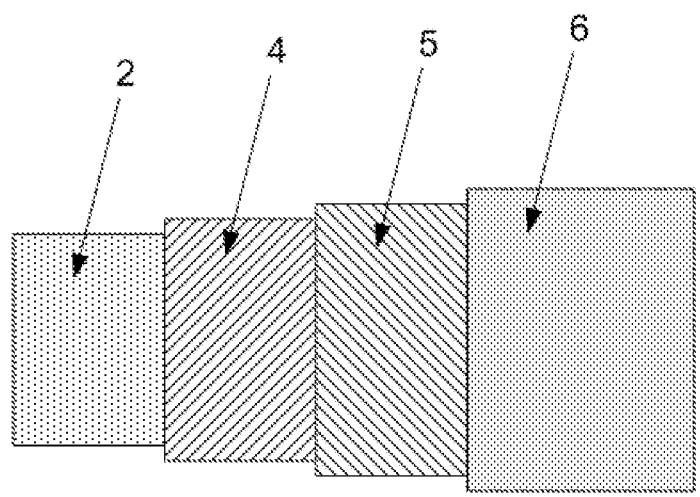
FIG. 2 shows a flexible pipe without a carcass.

FIG. 2 shows another pipe design. This flexible unbonded pipe comprises an inner liner 2 and a pair of outer armouring layers, 4, 5, in the form of wires wound around the inner liner 2. The two armour layers are cross wound at an angle to the centre axis of the pipe of close to 55 degree, typically one of the layers is wound at an angle slightly less than 55 degrees, e.g. between 52 and 55 degrees and the other of them is wound at an angle slightly more than 55 degrees e.g. between 55 and 57. The flexible pipe further comprises an outer sheath 6.

The flexible pipe preferably also comprises a not shown anti-wear layer between the armouring layers 4, 5.

At least one of the polymer layers, the inner liner 2, the anti-wear layers or the outer sheath 6 is a cationic clay silicate containing polymer.

Figure 3:
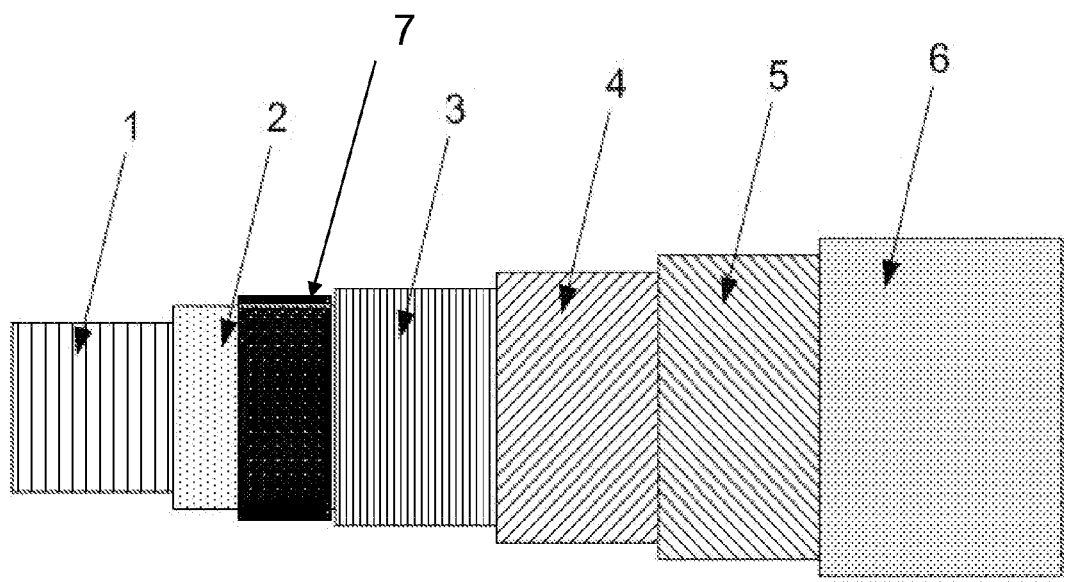
FIG. 3 shows a flexible pipe with a carcass and a thermal insulation.

FIG. 3 shows another pipe design, similar to the design shown in FIG. 1, but with a thermal insulation layer 7 applied between the inner liner 1 and the pressure armouring layer 3.

At least one of the polymer layers, the inner liner 2, the thermal insulating layer, the anti-wear layers or the outer sheath 6 is a cationic clay silicate containing polymer layer.

Some preferred embodiments have been shown in the foregoing, but it should be stressed that the invention is not limited to these, but may be embodied in other ways within the subject-matter defined in the following claims.

What is claimed is:

1. An unbonded flexible pipe for use in offshore transportation of oil products and gas products, the flexible pipe comprising at least one polymer layer including an inner liner, and at least one armouring layer on an outer side of and unbonded to said inner liner, which is a cationic clay silicate containing polymer layer of a polymer material comprising a polymer matrix and from about 0.1 to about 4% by weight of at least one cationic clay silicate, wherein said at least one cationic clay silicate is in the form of platelets having a thickness of about 10 nm or less.

2. An unbonded flexible pipe as claimed in claim 1 wherein said at least one cationic clay silicate is selected from kaolinite; smectite; Illite; or chlorite.

3. An unbonded flexible pipe as claimed in claim 1 wherein said at least one cationic clay silicate is selected from alumino-silicate(s) or magnesium-silicate(s).

4. An unbonded flexible pipe as claimed in claim 1 wherein said at least one cationic clay silicate has an octahedral metal element crystal lattice structure.

5. An unbonded flexible pipe as claimed in claim 1 wherein said at least one cationic clay silicate is an organo-cationic clay.

6. An unbonded flexible pipe as claimed in claim 5 wherein said organo-cationic clay comprises an adsorbed monolayer of a quaternary amine.

7. An unbonded flexible pipe as claimed in claim 5 wherein said organo-cationic clay is surface modified cationic clay silicate according to the following formula quaternary amine+−CLAY, wherein the quaternary amine preferably is selected from ditallow dimethyl ammonium chloride, hexadecyl ammonium chloride, octadecyl ammonium chloride, di-methyl di-hydrogenated tallow ammonium chloride, dicocodimethyl ammonium chloride, acids thereof, or mixtures thereof.

8. An unbonded flexible pipe as claimed in claim 1 wherein said cationic clay silicate(s) is in the form of platelets having an aspect ratio of at least about 50.

9. An unbonded flexible pipe as claimed in claim 1 wherein said at least one cationic clay silicate is exfoliated in the polymer matrix.

10. An unbonded flexible pipe as claimed in any one of the preceding claims wherein said at least one cationic clay silicate is intercalated in the polymer matrix.

11. An unbonded flexible pipe as claimed in claim 1 wherein said cationic clay silicate containing polymer layer(s) comprises at least about 50% by weight of one or more of the polymers polyolefins; polyamide; polyureas; polyesters; polyacetals; polyethers; polyoxides; polysulfides; polysulphones; polyacrylates; polyethylene terephthalate (PET); polyether-ether-ketones (PEEK); polyvinyls; polyacrylonitrils; polyetherketoneketone (PEKK); copolymers of the preceding and fluorous polymers.

12. An unbonded flexible pipe as claimed in claim 1 wherein the cationic clay silicate containing polymer matrix is cross-linked polyethylene (XLPE).

13. An unbonded flexible pipe as claimed in claim 12 wherein said XLPE is cross-linked by electromagnetic wave activation of a radical generator.

14. An unbonded flexible pipe for use in offshore transportation of oil products and gas products, the flexible pipe comprising at least one polymer layer, and at least one armouring layer unbonded to said polymer layer, said flexible pipe comprises an inner liner which is a cationic clay silicate containing polymer layer of a polymer material comprising a polymer matrix and from about 0.1 to about 4% by weight of at least one cationic clay silicate, said inner liner providing the innermost barrier to a fluid to be transported in the pipe, wherein said at least one cationic clay silicate is in the form of platelets having a thickness of about 10 nm or less.

15. An unbonded flexible pipe as claimed in claim 14 wherein the inner liner has a thickness of at least about 4 mm.

16. An unbonded flexible pipe as claimed in claim 1 wherein said cationic clay silicate containing polymer layer(s) comprises an outer sheath preferably providing the outermost barrier to water when the pipe in applied in water.

17. An unbonded flexible pipe as claimed in claim 1 wherein said cationic clay silicate containing polymer layer(s) comprises an intermediate layer in the form of a thermally insulating layer.

18. An unbonded flexible pipe as claimed in claim 1 wherein said cationic clay silicate containing polymer layer(s) has a thickness of at least about 0.5 mm.

19. An unbonded flexible pipe as claimed in claim 1 wherein said cationic clay silicate containing polymer layer(s) is an extruded layer.

20. An unbonded flexible pipe as claimed in claim 1 wherein said cationic clay silicate containing polymer layer(s) is a wound layer.

21. An unbonded flexible pipe as claimed in claim 1 wherein said cationic clay silicate containing polymer layer(s) comprises a film layer having a thickness of up to about 0.5 mm.

22. An unbonded flexible pipe as claimed in claim 21 wherein the film layer is a wound film layer or a folded film layer.

23. An unbonded flexible pipe as claimed in claim 21 wherein the film layer is a layered material comprising at least one polymer sub-layer comprising cationic clay silicates.

24. An unbonded flexible pipe as claimed in claim 21 wherein the film layer has a thickness of about 25 μm or more.

25. An unbonded flexible pipe as claimed in claim 21 wherein the film layer is applied in direct contact to, and innermost to another polymer layer.

26. An unbonded flexible pipe as claimed in claim 1 wherein the cationic clay silicate containing polymer layer additionally comprises filler material(s), preferably selected from the group consisting of pigments, heat stabilisers, process stabilisers, metal deactivators, flame-retardants, reinforcement fillers and mixtures thereof.

27. An unbonded flexible pipe as claimed in claim 1 wherein said pipe comprises one or more innermost unbonded armouring layers (carcass).

28. An unbonded flexible pipe according to claim 1 wherein said pipe comprises more than one unbonded armouring layers (outer armouring layers) on the outer side of an inner liner.

29. A method of producing an unbonded flexible pipe of claim 1 wherein the cationic clay silicate containing polymer layer is produced by a method comprising compounding the cationic clay silicate into the polymer at a temperature of about the melting point to +20° C. for the polymer in question.

30. A method of claim 29 wherein the cationic clay silicate containing polymer layer is produced by a method comprising compounding the cationic clay silicate into the polymer at a temperature of about the melting point to +10° C. for the polymer in question.

\* \* \* \* \*